United States Patent
Kanagovi et al.

(10) Patent No.: US 12,405,985 B1
(45) Date of Patent: Sep. 2, 2025

(54) RETRIEVAL-AUGMENTED GENERATION PROCESSING USING DYNAMICALLY SELECTED NUMBER OF DOCUMENT CHUNKS

(71) Applicant: Dell Products L.P., Round Rock, TX (US)

(72) Inventors: Ramakanth Kanagovi, Hyderabad (IN); Gaurav Bhattacharjee, Bangalore (IN); Ravi Shukla, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/978,284

(22) Filed: Dec. 12, 2024

(51) Int. Cl.
*G06F 16/00* (2019.01)
*G06F 16/3329* (2025.01)
*G06F 16/335* (2019.01)
*G06F 40/30* (2020.01)

(52) U.S. Cl.
CPC ...... *G06F 16/335* (2019.01); *G06F 16/33295* (2025.01); *G06F 40/30* (2020.01)

(58) Field of Classification Search
CPC .......................... G06F 16/335; G06F 16/33295
See application file for complete search history.

(56) References Cited

U.S. PATENT DOCUMENTS

| | | | |
|---|---|---|---|
| 11,860,914 B1 * | 1/2024 | Qadrud-Din | G06F 40/56 |
| 11,995,411 B1 * | 5/2024 | Qadrud-Din | G06N 3/045 |
| 12,039,256 B2 * | 7/2024 | Saha | G06F 40/166 |
| 12,039,263 B1 * | 7/2024 | Mondlock | G06F 40/20 |
| 12,105,600 B1 * | 10/2024 | Yadav | G06F 11/1451 |
| 12,111,859 B2 * | 10/2024 | Siebel | G06N 3/045 |
| 12,254,029 B1 * | 3/2025 | Veillon | G06F 16/285 |
| 12,260,342 B2 * | 3/2025 | Manda | G06N 5/01 |
| 12,277,489 B1 * | 4/2025 | Pradeep Shetty | G06N 3/0455 |
| 12,353,469 B1 * | 7/2025 | Mahabadi | G06Q 50/18 |
| 2007/0073641 A1 * | 3/2007 | Perry | G06F 16/335 |

(Continued)

OTHER PUBLICATIONS

Wikipedia, "Large Language Model," https://en.wikipedia.org/wiki/Large_language_model, Dec. 11, 2024, 30 pages.

(Continued)

*Primary Examiner* — Noosha Arjomandi
(74) *Attorney, Agent, or Firm* — Ryan, Mason & Lewis, LLP

(57) ABSTRACT

An apparatus comprises at least one processing device configured to obtain a query comprising search text and a context identifying documents to be searched using the search text, to generate document chunks by parsing the documents, to determine a degree of specificity of the search text, and to determine a number of the document chunks to select for retrieval-augmented generation processing based on the determined degree of specificity. The at least one processing device is also configured to select a subset of the document chunks based on similarity between the document chunks and the search text, the subset including the determined number of document chunks. The at least one processing device is further configured to generate and apply a prompt including the selected subset of the document chunks to a machine learning system to generate an output, and to provide an answer to the query based on the output.

20 Claims, 12 Drawing Sheets

(56) References Cited

U.S. PATENT DOCUMENTS

| | | | |
|---|---|---|---|
| 2016/0041777 A1* | 2/2016 | Tripathy | G06F 16/1752 |
| | | | 711/126 |
| 2016/0179953 A1* | 6/2016 | Klotz, Jr. | G06F 16/242 |
| | | | 707/722 |
| 2020/0159783 A1* | 5/2020 | Shlyunkin | G06F 16/951 |
| 2021/0390127 A1* | 12/2021 | Fox | G06F 16/335 |
| 2023/0376537 A1* | 11/2023 | Bansal | G06F 16/9024 |
| 2024/0135088 A1* | 4/2024 | Saha | G06F 40/289 |
| 2024/0202539 A1* | 6/2024 | Poirier | G06F 40/40 |
| 2024/0281677 A1* | 8/2024 | Mifflin | G06N 5/04 |
| 2024/0403341 A1* | 12/2024 | Berglund | G06F 16/3326 |
| 2025/0061139 A1* | 2/2025 | Levinson | G06F 16/3326 |
| 2025/0086215 A1* | 3/2025 | Kumar | G06F 16/345 |
| 2025/0165463 A1* | 5/2025 | Brenner | G06F 16/242 |
| 2025/0190460 A1* | 6/2025 | Madisetti | G06F 16/3329 |

OTHER PUBLICATIONS

Y. Gao et al., "Retrieval-Augmented Generation for Large Language Models: A Survey," arXiv:2312.10997v5, Mar. 27, 2024, 21 pages.

Dell Technologies, "Deploy High-performance Generative AI Solutions for the Enterprise," Jul. 2023, 2 pages.

Hugging Face, "Mixtral-8x7B-Instruct-v0.1," https://huggingface.co/mistralai/Mixtral-8x7B-Instruct-v0.1, Accessed Dec. 2, 2024, 7 pages.

* cited by examiner

STAGE 1: GENERATING QUESTIONS FROM EACH CHUNK

- IMPORT DOCUMENT CORPUS
- GENERATE CHUNKS FOR THE DOCUMENT CORPUS
- USE LARGE LANGUAGE MODEL (LLM) TO GENERATE AN EXHAUSTIVE AND DISTINCT LIST OF QUESTIONS FOR EACH CHUNK

⇩

STAGE 2: QUESTION PARAPHRASING

- PARAPHRASE QUESTIONS WITH SIMILAR OR IDENTICAL MEANINGS WITHIN THE QUESTION DATASET TO CREATE A MORE CONCISE COLLECTION OF QUESTIONS
- ASSOCIATE STANDARDIZED QUESTIONS WITH CORRESPONDING TEXT CHUNKS

⇩

STAGE 3: TRAINING A REGRESSION MODEL TO DETERMINE AN OPTIMAL NUMBER OF CHUNKS BASED ON QUESTION SPECIFICITY/GENERALITY

- IDENTIFY A TYPICAL NUMBER OF RELEVANT CHUNKS PER QUESTION (E.G., $95^{TH}$ PERCENTILE OF CHUNKS), $c$
- CALCULATE THE A SIMILARITY SCORE (E.G., USING COSINE SIMILARITY) OF STANDARDIZED QUESTIONS AND TOP $c$ CHUNKS
- DERIVE DISTRIBUTION STATISTICS FOR CHUNKS WITH THE TOP $c$ SEMANTIC SIMILARITY SCORES FOR EACH QUESTION (E.G., MEAN, MEDIAN, ETC.)
- PERFORM REGRESSION TRAINING BETWEEN THE NUMBER OF RELEVANT CHUNKS AS THE TARGET VALUE AND DISTRIBUTION STATISTICS AS INDEPENDENT VARIABLES

⇩

STAGE 4: USAGE OF THE MODEL DURING INFERENCE

- INFER ON REAL-TIME QUERIES (E.G., A CHATBOT IN PRODUCTION)
- FOR ANY QUERY BEING ASKED, THE MODEL FETCHES THE TOP $c$ SEMANTICALLY SIMILAR CHUNKS AND, USING THE TOP $c$ COSINE SIMILARITY VALUES AND THEIR AGGREGATED DISTRIBUTION STATISTICS, THE REGRESSION MODEL WILL PREDICT THE OPTIMAL NUMBER OF CHUNKS TO BE RETRIEVED

Metro protection

Metro provides bi-directional synchronous replication (active/active) across two PowerStore systems. A metro volume is exposed using two distinct systems, typically in two different data centers, up to 96 km (or 60 miles) apart, or in two distant locations within the same data center. The two systems cooperate to expose a single metro volume to application hosts by providing the same SCSI image and data. The hosts and application perceive the two physical volumes that are hosted by the two systems as a single volume with multiple paths.

403

Question 1: What is the distance limitation within which the two PowerStore systems can replicate data synchronously?

Question 2: How do hosts and applications perceive the two physical volumes hosted by two systems in a Metro environment?

Remote backup

Remote backup enables you to back up volumes and volume groups directly from PowerStore to a PowerProtect DD PowerStore supports backing up to a physical PowerProtect appliance or to a PowerProtect DD Virtual Edition (DDVE).

A remote backup creates a snapshot of a volume or a volume group on the PowerProtect system. The created snapshots are crash-consistent and there is no application integration.

503

Question 1: What is the purpose of remote backup in PowerStore?

Question 2: What are the target options for remote backups in PowerStore?

Refresh a storage resource

The refresh operation is used to replace the contents of a storage resource with contents from a related resource (a clone or an indirect child snapshot). You can create a duplicate of the production environment to be used for various purposes (such as test and development, reporting etc.). To keep the duplicated environment up-to-date, it should be updated with a storage resource that includes the recent changes.

603

Question 1: How can duplicated environment be kept up-to-date?

Question 2: What is the purpose of using the refresh operation in a storage resource?

FIG. 6

| Generated Question | Chunk | Representative Question |
|---|---|---|
| How does Metro technology improve resilience in PowerStore environments? | When an existing metro volume is assigned with a protection policy, or a volume with a protection policy is configured for metro, the same protection is applied to the metro volume on both systems. The protection policy that is created on the remote system is read-only. Changes to the protection policy and snapshot rules can only be made to the policy created by the user (regardless of the storage system it was created on). The read-only policy is synchronized with the changes every 15 minutes. | How does Metro enhance PowerStore's capability for continuous data availability? |
| What is the main advantage of using Metro for PowerStore data protection? | Metro protection provides bi-directional synchronous replication, where both sides of the Metro volume can be used for production. Instead of disaster recovery (by failing over a replication session to a remote system), Metro enables disaster avoidance by providing automatic synchronization between the systems without downtime. | How does Metro enhance PowerStore's capability for continuous data availability? |
| How does Metro enhance PowerStore's capability for continuous data availability? | Metro provides bi-directional synchronous replication (active/active) across two PowerStore systems. A metro volume is exposed using two distinct systems, typically in two different data centers, up to 96 km (or 60 miles) apart, or in two distant locations within the same data center. The two systems cooperate to expose a single metro volume to application hosts by providing the same SCSI image and data. The hosts and application perceive the two physical volumes that are hosted by the two systems as a single volume with multiple paths. Metro protection enables increased availability and disaster avoidance, resource balancing across data centers, and storage migration between two PowerStore systems. | How does Metro enhance PowerStore's capability for continuous data availability? |

Question: What is a key aspect of the Dell PowerStore Manager in relation to Windows Admin Center?

1003-1

The Dell PowerStore Manager for Windows Admin Center is a solution extension that provides tools to manage PowerStore hosts, host groups, volumes, and volume groups for Windows servers and clusters that are connected to Windows Admin Center. The solution extension filters out storage objects that are not related to Windows servers and clusters connected to Windows Admin Center.

1003-2

The Dell PowerStore Manager extension is distributed as a NuGet package for Windows Admin Center. By default, Windows Admin Center points to the Microsoft official NuGet feed which hosts extensions published by Microsoft and other developers.

1003-3

To install the Dell PowerStore Manager extension, users should have knowledge of Windows Admin Center, its use, and functions.

About this task

If Windows Admin Center is installed on a computer that is not connected to the internet or is behind a proxy server, it may not be able to access and install the Dell PowerStore Manager extension from the Windows Admin Center feed. You can download the extension package manually, and configure Windows Admin Center to retrieve the package from a file share or local drive.

FIG. 10

RETRIEVAL-AUGMENTED GENERATION PROCESSING USING DYNAMICALLY SELECTED NUMBER OF DOCUMENT CHUNKS

BACKGROUND

As the value and use of information continues to increase, individuals and businesses seek additional ways to process and store information. Information processing systems may be used to process, compile, store and communicate various types of information, including through the use of artificial intelligence (AI) and machine learning (ML). Large language models (LLMs) are a type of AI system that uses ML algorithms to process vast amounts of natural language text data. LLMs may be used to perform various natural language processing (NLP) tasks, including text classification, text summarization, text generation, named entity recognition, text sentiment analysis, and question answering.

SUMMARY

Illustrative embodiments of the present disclosure provide techniques for retrieval-augmented generation processing using a number of document chunks that are dynamically selected based at least in part on a determined degree of specificity of the search text of a query.

In one embodiment, an apparatus comprises at least one processing device comprising a processor coupled to a memory. The at least one processing device is configured to obtain a query, the query comprising search text and a context, the context identifying one or more documents to be searched using the search text, and to generate a plurality of document chunks by parsing the one or more documents, each of the plurality of document chunks comprising a portion of content of one of the one or more documents. The at least one processing device is also configured to determine a degree of specificity of the search text in the query and to determine, based at least in part on the determined degree of specificity of the search text, a number of the plurality of document chunks to select for retrieval-augmented generation processing. The at least one processing device is further configured to select a subset of the plurality of document chunks based at least in part on determining a similarity between content of the plurality of document chunks and the search text, the subset including the determined number of the plurality of document chunks. The at least one processing device is further configured to generate, based at least in part on the query, a prompt for input to a machine learning system, the prompt comprising the selected subset of the plurality of document chunks, to apply the prompt to the machine learning system to generate an output, and to provide an answer to the query based at least in part on the output of the machine learning system.

These and other illustrative embodiments include, without limitation, methods, apparatus, networks, systems and processor-readable storage media.

BRIEF DESCRIPTION OF THE DRAWINGS

FIG. 3 shows a process flow for determining an optimal number of chunks to be retrieved in retrieval-augmented generation processing in an illustrative embodiment.

FIG. 4 shows an example of a document chunk and questions generated therefrom in an illustrative embodiment.

FIG. 5 shows another example of a document chunk and questions generated therefrom in an illustrative embodiment.

FIG. 6 shows another example of a document chunk and questions generated therefrom in an illustrative embodiment.

FIG. 7 shows an example of selecting a representative question for a cluster of generated questions in an illustrative embodiment.

FIG. 10 shows an example of a standardized question and its relevant chunks in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
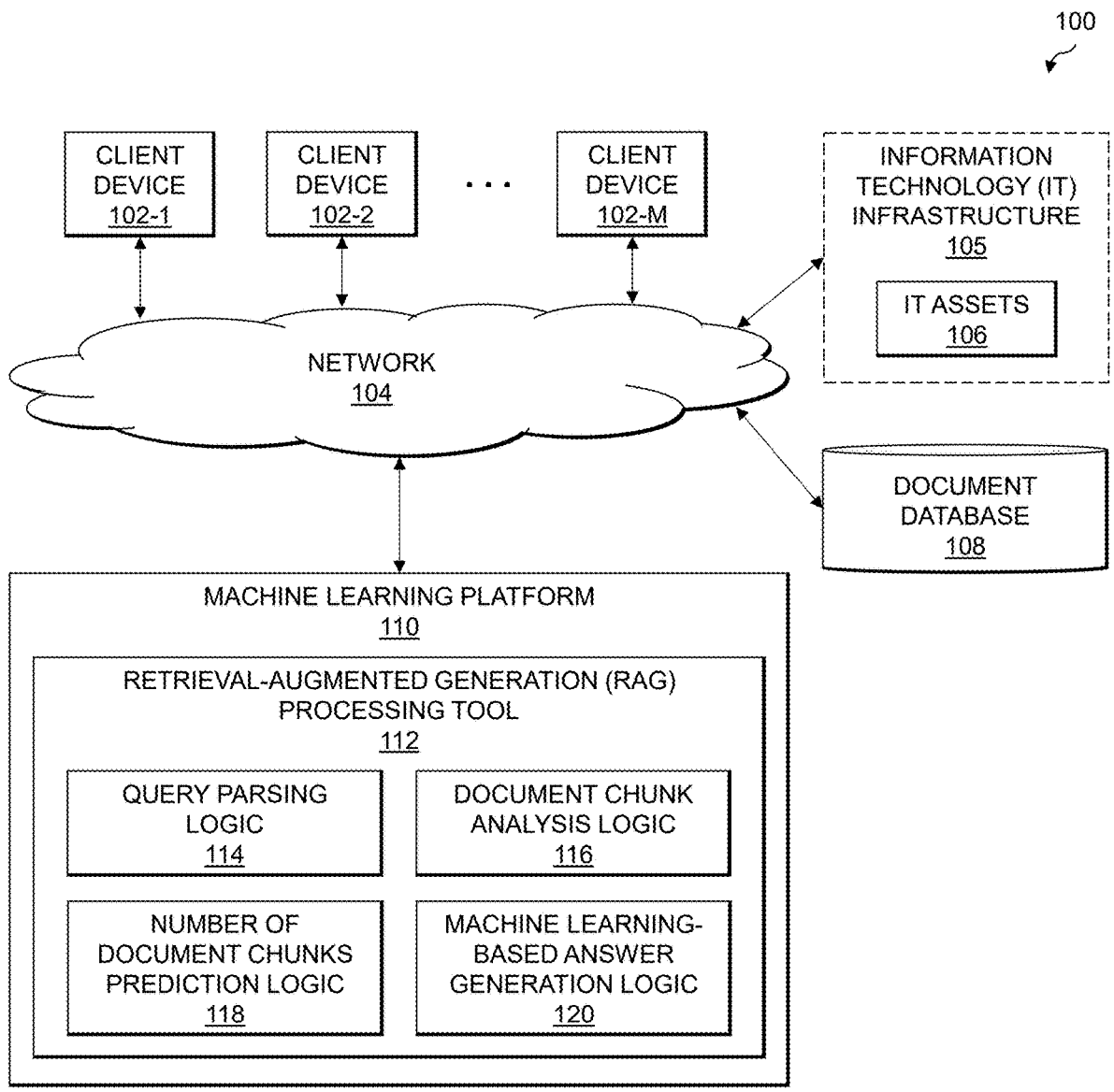
FIG. 1 is a block diagram of an information processing system configured for retrieval-augmented generation processing using a number of document chunks that are dynamically selected based at least in part on a determined degree of specificity of the search text of a query in an illustrative embodiment.

FIG. 1 shows an information processing system 100 configured in accordance with an illustrative embodiment. The information processing system 100 is assumed to be built on at least one processing platform and provides functionality for retrieval-augmented generation (RAG) processing using a number of document chunks that are dynamically selected based at least in part on a determined degree of specificity of the search text of a query. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a document database 108, and a machine learning platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the machine learning platform 110 is used for an enterprise system. For example, an enterprise may subscribe to or otherwise utilize the machine learning platform 110 for performing searches or queries related to documents stored in the document database 108, documents produced by or otherwise related to operation of the IT assets 106 of the IT infrastructure 105, etc. For example, users of the client devices 102 may submit searches or queries to the machine learning platform 110 to perform intelligent searching of documents from the document database 108, where such documents may but are not required to be produced by or otherwise associated with operation of the IT assets 106 of the IT infrastructure 105. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The document database 108 is configured to store and record various information that is utilized by the machine learning platform 110 and the client devices 102. Such information may include, for example, information that is collected regarding operation of the IT assets 106 of the IT infrastructure 105 (e.g., support tickets, logs, etc.). The machine learning platform 110 may be utilized by the client devices 102 to perform searches of such information in order to perform troubleshooting and remediation of issues encountered on the IT assets 106 of the IT infrastructure 105. The document database 108 may also or alternatively store information regarding technical guides, support documents, etc. relating to configuration and operation of the IT assets 106 of the IT infrastructure 105. The client devices 102 may utilize the machine learning platform 110 to query such technical guides, support documents, etc. to assist in performing configuration of the IT assets 106 of the IT infrastructure 105, to perform troubleshooting and remediation of issues encountered on the IT assets 106 of the IT infrastructure 105, etc. The document database 108 may also store any documents or other information that is desired to be searched utilizing the machine learning platform 110, including information that is unrelated to the IT assets 106 of the IT infrastructure 105.

The document database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the machine learning platform 110, as well as to support communication between the machine learning platform 110 and other related systems and devices not explicitly shown.

The machine learning platform 110 may be provided as a cloud service that is accessible by one or more of the client devices 102 to allow users thereof to perform generative artificial intelligence (AI) or other machine learning tasks, where such tasks utilize RAG processing. The client devices 102 may be configured to access or otherwise utilize the machine learning platform 110 (e.g., as part of interaction with an AI chatbot, a Large Language Model (LLM), etc.). This may include performing searches or otherwise querying the machine learning platform 110. Such searches or queries may be related to tasks such as configuration of the IT assets 106 of the IT infrastructure 105, operation of the IT assets 106 of the IT infrastructure 105, troubleshooting and remediation of issues encountered on the IT assets 106 of the IT infrastructure 105, etc. In some embodiments, the client devices 102 are assumed to be associated with software developers, system administrators, IT managers or other authorized personnel responsible for managing the IT assets 106 of the IT infrastructure 105. In some embodiments, the IT assets 106 of the IT infrastructure 105 are owned or operated by the same enterprise that operates the machine learning platform 110. In other embodiments, the IT assets 106 of the IT infrastructure 105 may be owned or operated by one or more enterprises different than the enterprise which operates the machine learning platform 110 (e.g., a first enterprise provides search functionality support for multiple different customers, businesses, etc.). Various other examples are possible.

In some embodiments, the client devices 102 and/or the IT assets 106 of the IT infrastructure 105 may implement host agents that are configured for automated transmission of information with the document database 108 and the machine learning platform 110 regarding searches (e.g., queries, answers to queries, etc.). It should be noted that a "host agent" as this term is generally used herein may comprise an automated entity, such as a software entity running on a processing device. Accordingly, a host agent need not be a human entity.

The machine learning platform 110 in the FIG. 1 embodiment is assumed to be implemented using at least one processing device. Each such processing device generally comprises at least one processor and an associated memory, and implements one or more functional modules or logic for controlling certain features of the machine learning platform 110. In the FIG. 1 embodiment, the machine learning platform 110 implements a RAG processing tool 112. The RAG processing tool 112 comprises query parsing logic 114, document chunk analysis logic 116, number of document chunks prediction logic 118, and machine learning-based answer generation logic 120. The query parsing logic 114 is configured to obtain queries, where a given query comprises search text and a context, the context identifying one or more documents (e.g., from the document database 108) to be searched using the search text. The document chunk analysis logic 116 is configured to determine a set of document chunks which are semantically similar to the given query, and to determine aggregated distribution statistics for the semantically similar document chunks. The number of document chunks prediction logic 118 is configured to utilize a regression model to determine a number of document chunks to be retrieved as part of RAG processing of the given query, where the regression model utilizes the aggregated distribution statistics for the semantically similar document chunks in this determination. The machine learning-based answer generation logic 120 is configured to select the determined number of document chunks, and to generate, based at least in part on the given query, a prompt for input to a machine learning system (e.g., a large language model (LLM)), the prompt comprising the selected document chunks. The machine learning-based answer generation logic 120 is further configured to apply the prompt to the machine learning system to generate an output, and to provide an answer to the query based at least in part on the output of the machine learning system.

At least portions of the RAG processing tool 112, the query parsing logic 114, the document chunk analysis logic 116, the number of document chunks prediction logic 118, and the machine learning-based answer generation logic 120 may be implemented at least in part in the form of software that is stored in memory and executed by a processor.

It is to be appreciated that the particular arrangement of the client devices 102, the IT infrastructure 105, the document database 108 and the machine learning platform 110 illustrated in the FIG. 1 embodiment is presented by way of example only, and alternative arrangements can be used in other embodiments. As discussed above, for example, the machine learning platform 110 (or portions of components thereof, such as one or more of the RAG processing tool 112, the query parsing logic 114, the document chunk analysis logic 116, the number of document chunks prediction logic 118, and the machine learning-based answer generation logic 120) may in some embodiments be implemented internal to the IT infrastructure 105.

The machine learning platform 110 and other portions of the information processing system 100, as will be described in further detail below, may be part of cloud infrastructure.

The machine learning platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the document database 108 and the machine learning platform 110 or components thereof (e.g., the RAG processing tool 112, the query parsing logic 114, the document chunk analysis logic 116, the number of document chunks prediction logic 118, and the machine learning-based answer generation logic 120) may be implemented on respective distinct processing platforms, although numerous other arrangements are possible. For example, in some embodiments at least portions of the machine learning platform 110 and one or more of the client devices 102, the IT infrastructure 105, the IT assets 106 and/or the document database 108 are implemented on the same processing platform. A given client device (e.g., 102-1) can therefore be implemented at least in part within at least one processing platform that implements at least a portion of the machine learning platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the document database 108 and the machine learning platform 110, or portions or components thereof, to reside in different data centers. Numerous other distributed implementations are possible. The machine learning platform 110 can also be implemented in a distributed manner across multiple data centers.

Additional examples of processing platforms utilized to implement the machine learning platform 110 and other components of the information processing system 100 in illustrative embodiments will be described in more detail below in conjunction with FIGS. 11 and 12.

It is to be understood that the particular set of elements shown in FIG. 1 for retrieval-augmented generation processing using a number of document chunks that are dynamically selected based at least in part on a determined degree of specificity of the search text of a query is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for retrieval-augmented generation processing using a number of document chunks that are dynamically selected based at least in part on a determined degree of specificity of the search text of a query will now be described in more detail with reference to the flow diagram of FIG. 2. It is to be understood that this particular process is only an example, and that additional or alternative processes for retrieval-augmented generation processing using a number of document chunks that are dynamically selected based at least in part on a determined degree of specificity of the search text of a query may be used in other embodiments.

In this embodiment, the process includes steps 200 through 214. These steps are assumed to be performed by the machine learning platform 110 utilizing the RAG processing tool 112, the query parsing logic 114, the document chunk analysis logic 116, the number of document chunks prediction logic 118, and the machine learning-based answer generation logic 120. The process begins with step 200, obtaining a query comprising search text and a context, the context identifying one or more documents to be searched using the search text.

In step 202, a plurality of document chunks are generated by parsing the one or more documents, each of the plurality of document chunks comprising a portion of content of one of the one or more documents.

In step 204, a degree of specificity of the search text in the query is determined. Determining the degree of specificity of the search text in the query may include analyzing distribution statistics of semantic similarity scores for a threshold number of the plurality of document chunks most similar to the search text. Determining the degree of specificity of the search text in the query may include selecting a threshold number of the plurality of document chunks exhibiting a highest semantic similarity to the search text, calculating semantic similarity scores for the selected threshold number of the plurality of document chunks exhibiting the highest semantic similarity to the search text, calculating distribution statistics for the calculated semantic similarity scores, and determining the degree of specificity of the search text as a function of the calculated distribution statistics. The distribution statistics may include a mean of the calculated semantic similarity scores, and determining the degree of specificity of the search text as the function of the calculated distribution statistics may include determining the degree of specificity inversely proportional to the mean of the calculated semantic similarity scores.

In step 206, a number of the plurality of document chunks to select for RAG processing of the query is determined based at least in part on the determined degree of specificity of the search text. A subset of the plurality of document chunks is selected in step 208 based at least in part on determining a similarity between content of the plurality of document chunks and the search text, the subset including the determined number of the plurality of document chunks.

Determining the number of the plurality of document chunks to select for RAG processing of the query may include utilizing a regression model trained utilizing representative questions generated for the one or more documents, each of the representative questions being associated with a subset of the plurality of document chunks that each of the representative questions is relevant for. The representative questions for the one or more documents may be generated by generating a plurality of questions from the one or more documents utilizing a large language model, and selecting a subset of the plurality of questions as representative questions. Generating the plurality of questions from the one or more documents may include generating, for each of the plurality of document chunks, a set of one or more questions. Selecting the subset of the plurality of questions as representative questions may be based at least in part on clustering the plurality of questions into a set of question clusters, each question cluster including one or more of the plurality of questions exhibiting semantic similarity with one another.

The regression model may be trained by identifying a characteristic number of relevant document chunks for each of the representative questions, for each of the representative questions calculating a semantic similarity score between the representative question and the plurality of document chunks and determining distribution statistics for the characteristic number of the plurality of document chunks having the highest calculated semantic similarity scores, and training the regression model utilizing a number of the plurality of document chunks that are relevant for each of the representative questions as a target variable and the determined distribution statistics as independent variables. The characteristic number may be a calculated threshold percentile (e.g., $95^{th}$ percentile) of the number of relevant document chunks for the representative questions. The calculated semantic similarity scores may be cosine similarity values. The distribution statistics may include at least two or mean, median, standard deviation, kurtosis and skewness. The regression model may be a random forest regressor model.

A prompt for input to a machine learning system is generated in step 210 based at least in part on the query, the prompt comprising the selected subset of the plurality of document chunks. The prompt is applied to the machine learning system in step 212 to generate an output. An answer to the query is provided in step 214, the answer being based at least in part on the output of the machine learning system. The machine learning system may include an LLM utilizing the RAG processing.

Figure 2:
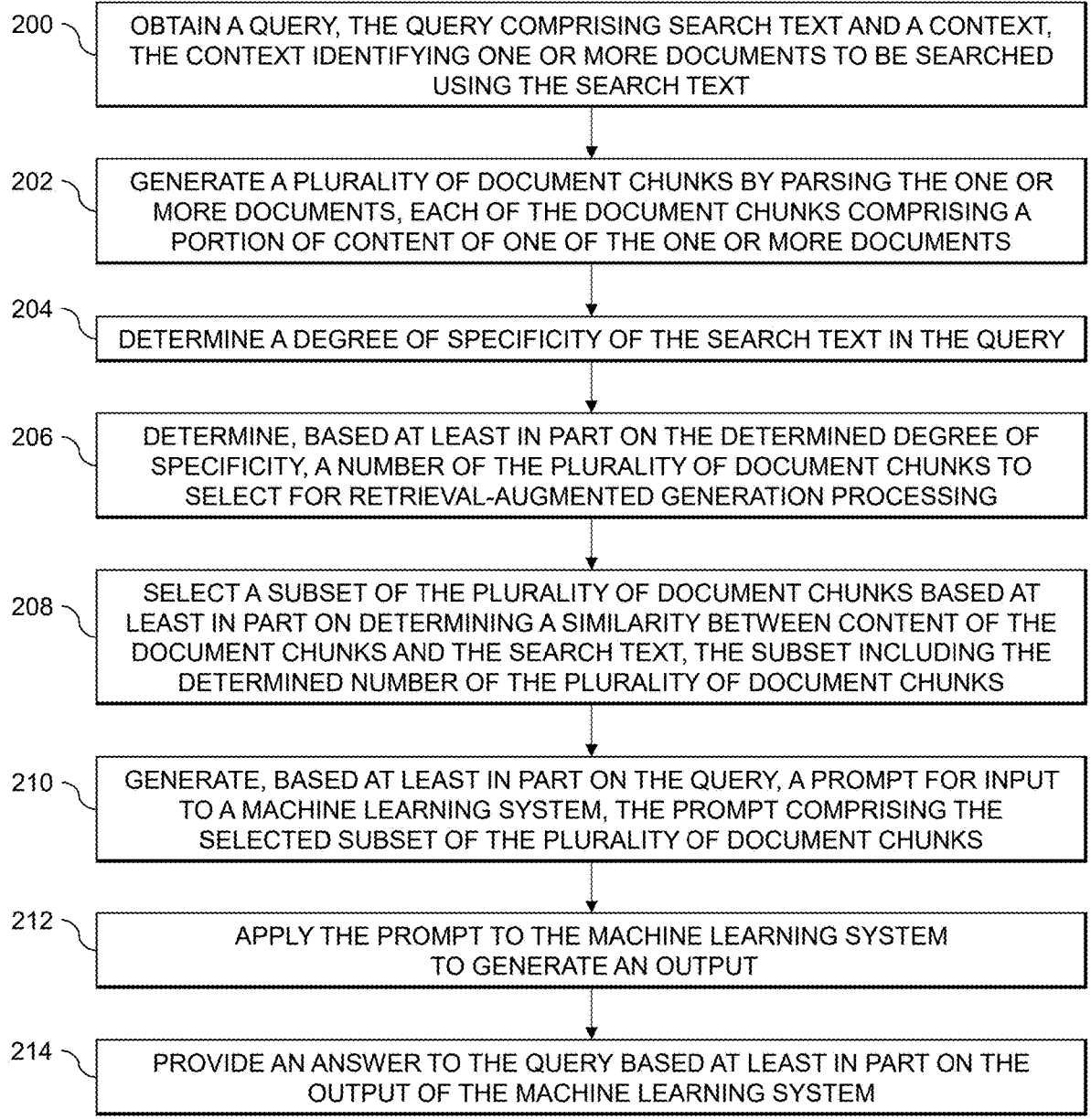
FIG. 2 is a flow diagram of an exemplary process for retrieval-augmented generation processing using a number of document chunks that are dynamically selected based at least in part on a determined degree of specificity of the search text of a query in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Large Language Models (LLMs), such as the OpenAI Chat Generative Pre-Trained Transformer (ChatGPT) model, are a type of machine learning model that can provide a better alternative to traditional search engines in helping users find pieces of information that they are looking for, and in providing more concise and relevant answers, albeit with a risk that the answers may be irrelevant or incorrect. The query that a user types is given as input to the LLM, along with an appropriate context, which is the text that the LLM should "search" for an answer. This is referred to as prompt engineering. A problem with this approach is that the size of the prompt is limited. For example, the limit for GPT3.5-Turbo is 4,096 tokens, and for GPT4 it is 8,192 tokens. The input documents can often be orders of magnitude larger than this limit. For example, a user may utilize an LLM to query product guides for IT assets, where the product guides are orders of magnitude larger than such limits (e.g., tens or hundreds of pages). Thus, an approach referred to as RAG may be used to break the input documents into chunks that are small enough to fit the prompt size limitations. For a given query, RAG attempts to combine the most relevant chunks together with the query as the input prompt to the LLM, which presents answers to the user. The LLM, together with RAG processing, may be used in a wide variety of use cases, including generative artificial intelligence (GenAI) conversational artificial intelligence (AI), chatbots, etc.

RAG combines retrieval and generation components to produce high-quality responses to user queries. The retrieval component identifies relevant information from a large corpus for a given query, while the generation component uses this information to generate a coherent and informative answer. One of the critical steps in the RAG process is chunking, which involves dividing the corpus of all documents into smaller text segments or chunks. In a RAG system, for a given query, a semantic search against all the chunks from the corpus is triggered to determine the most relevant chunks for the query to answer from.

The decision of how many chunks to retrieve and pass to the generation component is a crucial step, as it has a direct effect on the quality and completeness of the generated answer. Conventional approaches may use a fixed number of chunks or threshold-based selection of the number of chunks. For approaches that use a fixed number of chunks, a predefined number of chunks (e.g., top-k) are selected based on their relevance scores or similarity to the input query. While simple to implement, this strategy may miss important information if the fixed number is too small, or include irrelevant information if the fixed number is too large. The problem, particularly with a larger number of chunks, is the potential infusion of noise in the LLM context. For approaches that use threshold-based selection, chunks are selected based on a relevance score/semantic similarity score threshold where only chunks with scores above the threshold are considered. The main challenge with this approach is determining an appropriate threshold value, which is very subjective, lacking rational and empirical reasons. Conventional approaches that use one-size-fits-all methods for selecting the number of chunks to utilize in RAG processing are fundamentally constrained, lacking the flexibility to cater to the varying complexity and information needs of diverse queries. Such conventional approaches risk either retrieving an inadequate amount of context which leads to incomplete or inaccurate responses, or retrieving an excessive amount of noise which overwhelms the generation component with irrelevant information.

Illustrative embodiments provide technical solutions for an enhanced RAG approach that is configured, in real-time, to intelligently determine and select optimal numbers of chunks for RAG processing of different input queries. The technical solutions may utilize a supervised learning-based strategy within a GenAI framework to differentiate questions or queries by specificity and granularity. The technical solutions, instead of using a fixed number or threshold-based approach for selecting the number of chunks, utilize an adaptive number of chunks selection strategy that is able to dynamically adjust the number of chunks to be retrieved for RAG processing based on the specificity of an input query.

In some embodiments, query-aware chunking techniques are incorporated that consider the degree of specificity or generality present in the input query (e.g., a question posed by a user). This advantageously assists in determining the optimal number of chunks to be retrieved for RAG processing, thereby mitigating the risk of information loss or noise infusion in the context for LLM answer generation.

In some embodiments, a combination of an open source LLM, along with Semantic Cohesion and data-driven supervised learning techniques are leveraged to determine the most appropriate number of chunks to be retrieved for a given input query. An enterprise, organization or other entity may utilize strategic partnerships to provide on-premises infrastructure and a comprehensive AI framework for GenAI. This enables customers or other users of the entity to rapidly drive GenAI initiatives into value. An enterprise, organization or other entity may provide a validated design for GenAI that offers a ready-made foundation with pre-tested software and hardware tailored for GenAI projects. This is particularly advantageous for RAG applications, allowing for building GenAI assistants. The technical solutions described herein can solidify and improve the foundational block of retrieval in RAG processing by accurately retrieving the right, optimal or appropriate number of chunks stored in the vector store. This will enhance the overall accuracy of the RAG processing pipeline by ensuring the retrieval is done more precisely. The technical solutions described herein can be embedded within a GenAI framework for optimal or improved RAG performance.

FIG. 3 shows a process flow 300 for implementing the technical solutions for selecting the number of chunks to be utilized in RAG processing for different input queries that are to be processed using a machine learning model (e.g., an LLM). The process flow 300 includes four steps or stages, beginning with generating questions from each chunk in stage 1. Stage 1 may include importing a document corpus, generating chunks for the document corpus, and using an LLM to generate an exhaustive and distinct list of questions for each chunk. In Stage 2, question paraphrasing is performed. Stage 2 may include paraphrasing questions with similar or identical meanings within the question dataset to create a more concise collection of questions, and associating standardized questions with corresponding text chunks. In Stage 3, a regression model is trained to determine an optimal number of chunks to utilize for RAG processing based on the specificity/generality of an input question or query. Stage 3 may include identifying a typical number of relevant chunks per question (e.g., for the $95^{th}$ percentile of chunks), denoted C, calculating similarity scores (e.g., using cosine similarity) of the standardized questions and their top C chunks, and deriving distribution statistics of the top C semantic similarity scores for each question. The distribution statistics may include the mean, median, standard deviation, etc. Regression training is then performed between the number of relevant chunks as the target value and the distribution statistics as independent variables. In Stage 4, the trained regression model is used during inference. Stage 4 may include performing inference for queries in real-time (e.g., as part of an AI chatbot in a production environment). For any query being asked, the regression model is used to fetch the top C semantically similar chunks and, using the top C similarity values and their aggregated distribution statistics, the regression model will predict the optimal number of chunks to be retrieved for RAG processing of that query. The stages of the process flow 300 will now be discussed in further detail.

In Stage 1, questions are generated from each chunk. This includes the following steps:
1. Collect a corpus of documents (e.g., technical documents, such as product guides, manuals, etc.).
2. Break the corpus of documents into N chunks of size s. While breaking documents into chunks, it is ensured that a sentence is not left incomplete. Thus, each chunk is not necessarily exactly equal in size.
3. Utilize an LLM (e.g., an open source LLM) to generate questions from each chunk as a context. The LLM is prompted in a way that the questions generated for each chunk are distinct and exhaustive in nature.
4. Across all chunks of total count N, there is a questions_list generated for each one, denoted as questions_list (1), questions_list (2), . . . , questions_list (N). It should be noted that the number of questions in each list need not be the same; different numbers of questions may be generated for different ones of the chunks.

In Stage 2, the questions generated in Stage 1 are paraphrased. Since the chunks from the entire corpus can come from similar domains, the questions generated across chunks can be identical/similar, and therefore there is a scope to standardize them. This includes the following steps:
1. Cluster the exhaustive list of questions with similar semantics into groups or clusters. Let the number of clusters be decided as per optimal separation.
2. For each cluster, identify a single standardized question that captures the core meaning of all its similar questions. In some embodiments, the standardized question is the question closest to the centroid of the cluster. All questions within a cluster are replaced with the standardized question representation.
3. Create a data frame that has the list of these standardized questions, Q, as rows and the number of chunks that each of the standardized questions is relevant for, denoted Y. Given each original question (unstandardized form) is generated from a particular chunk, the above matrix can be created.

An intuition in Stage 2 is that if a question is very specific, then the number of chunks that are relevant (the value of Y) will be less. If a question is too generic, then the number of chunks that are relevant (the value of Y) may be very high. The technical solutions described herein provide an approach for finding the optimal number of chunks to be retrieved for RAG processing based on the specificity/generality of the question.

In Stage 3, a regression model is trained to determine the optimal number of chunks based on the specificity/generality of a question or input query. This may include the following steps:
1. Calculate the $95^{th}$ percentile (or other subjective upper cutoff) of the number of chunks that are relevant for each of the generated questions, to understand a typical maximum number of chunks that are relevant for each question. It is assumed that this arrives at C number of chunks.
2. Calculate the semantic similarity (e.g., cosine similarity) of each standardized question with all chunks, and retain only scores for the top C similarity values.
3. Arrive at the distribution statistics (e.g., mean, median, standard deviation, kurtosis, skewness, etc.) based on the top C cosine similarity values to analyze the similarity distribution for each standardized question. An intuition here is that, for a very generic question, the distribution of the top C cosine similarity values would center very closely around the mean, and vice versa. The reason for this is that, for a generic question, there are likely to be many chunks with similar scores while for a specific question only a few chunks will have good scores and the rest will be low.
4. Form a data frame or other data structure with all standardized questions as indexes of rows, with the target variable being the relevant number of chunks for each question ($\leq C$), and the independent variable being all the distribution statistics. An intuition here is that the number of relevant chunks to be retrieved for a given query is dependent on the generality/specificity of the query itself. As mentioned above, the proxy for the same can be the distribution statistics of the top C semantically similar chunks.
5. Train a regression model using machine learning tools and frameworks (e.g., AutoML), where the number of relevant chunks (Y) is a function of the distribution statistics derived from the cosine similarity values.

In Stage 4, the trained regression model is used for inference. For any query being asked, the trained regression model will fetch the top C semantically similar chunks and, using the top C cosine similarity values and their aggregated distribution statistics, will predict the optimal number of chunks to be retrieved. Since the data is trained on an exhaustive list of questions from the domain corpus (the population of all chunks), the regression model is a good representative of the domain and can perform well for out-of-sample questions also, though the likeliness is low given that in the questions generation during Stage 1 almost all exhaustive questions will be covered.

An example implementation of the process flow 300 shown in FIG. 3 will now be described. In this example, a document corpus of 20 documents related to Dell PowerStore was used. The document corpus included a total of 2469 chunks.

In Stage 1, each chunk was fed as a context to an LLM model (e.g., Mixtral-8x7B-Instruct-v0.1) to generate an exhaustive set of questions. In this example, a total of 5672 questions were generated from the 2469 chunks in the document corpus. FIGS. 4-6 show samples of chunks 401, 501 and 601 and corresponding sets of questions 403, 503 and 603 generated therefrom.

In Stage 2, the large collection of 5672 generated questions is paraphrased by leveraging clustering techniques to identify thematic groups within the data and subsequently generate a representative or standardized question for each cluster/theme. This includes text clustering, centroid identification, and centroid-based question representation. For text clustering, the 5672 questions were fed into a clustering algorithm. This algorithm analyzed the semantic similarities between questions, grouping those with similar meaning or topic together. The clustering process resulted in the creation of 788 clusters. Each clusters' centroid represents the "center" embodying the core meaning or theme shared by the questions within that group. To summarize the information captured in each cluster, the question closest to the centroid is considered as the representative of the cluster. This representative question aims to succinctly capture the essence of the corresponding cluster, reflecting the thematic content of the grouped questions. This representative question is used to replace all the other cluster member's questions to create a paraphrased and standardized question collection. The result is boiling down the large collection of 5672 generated questions to 788 standardized questions. FIG. 7 shows a table 700 illustrating an example of selection of a representative question for a cluster of generated questions. The table 700 includes a column for the generated questions that are produced in Stage 1 and clustered together in Stage 2, along with their corresponding chunks and the representative question selected for this cluster.

Figure 8:
FIG. 8 shows an example data structure of questions and their number of relevant chunks and their distribution statistics in an illustrative embodiment.
Figure 9:
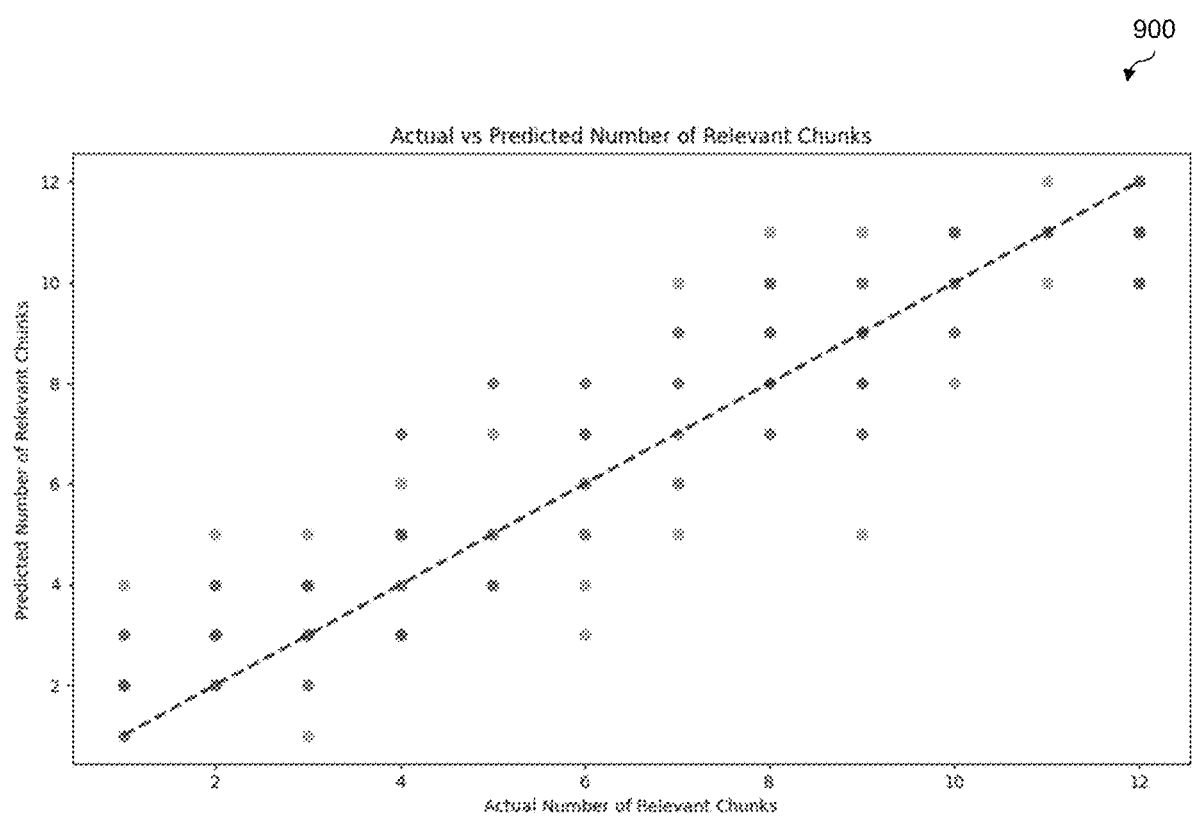
FIG. 9 shows a plot of actual and predicted numbers of relevant chunks for retrieval-augment generation processing in an illustrative embodiment.

In Stage 3, a regression model is trained to determine an optimal number of chunks based on a question's specificity/generality. As a result of the Stage 2 processing, there is a data frame or data structure with two columns, namely, (1) the standardized or representative questions and (2) the number of chunks that each standardized or representative question is relevant to. The 95th percentile of the number of relevant chunks column is calculated, with the result (e.g., "C") for this dataset being a value of 12. The cosine similarity between each question and each chunk is then measured. Cosine similarity indicates how closely related the question's meaning is to the content of each chunk. The top 12 scores are picked, followed by computing distribution statistics (e.g., mean, median, standard deviation, kurtosis and skewness) of these 12 scores. The final data frame or data structure contains the question (encoded as numeric values Q-1, Q-2, Q-3, etc.), the number of chunks that each question is relevant to, and the distribution statistics (mean, median, standard deviation, kurtosis and skewness). FIG. 8 shows a table 800 illustrative a portion of such a data structure for four questions. As can be seen from the table 800, the questions that are relevant to only a few chunks (e.g., the questions that are very specific) have a lower mean compared to questions which are more general in nature. A random forest regressor model is trained along with performing hyperparameter tuning using this dataset of 788 questions. The target variable is the number of relevant chunks and the independent variables are the distribution statistics numbers. FIG. 9 shows a plot 900 of the actual versus predicted number of relevant chunks, illustrating the performance of the trained random forest regressor model on the test dataset. The best hyperparameter values (e.g., n_estimators: 400, min_samples_split: 10, min_samples_leaf: 4, max_features: log 2, max_depth: 15) are added which are optimal for a low RMSE (1.3383) and a high R2 number (0.8567).

In Stage 4, the trained regression model is used for new data. The model performance on the new data is considered for a standardized question which was relevant for 6 chunks. FIG. 10 shows the standardized question 1001 and three of the relevant sample chunks 1003-1, 1003-2 and 1003-3 (collectively, chunks 1003). The optimal number of chunks predicted by the trained regression model for this question was 7.

The technical solutions described herein employ a novel method for dynamically determining the optimal number of chunks for retrieval in RAG processing based on the degree of generality or specificity of the queries in systems implementing RAG processing. The degree of generality or specificity, in some embodiments, is proxied by analyzing the distribution statistics of semantic similarity scores from the top C most similar chunks during the retrieval process. These distribution statistics are processed through a regression model which calculates the optimal number of chunks to retrieve. This approach ensures that the retrieval process is both efficient and tailored to the specific needs of the query, enhancing the overall performance and accuracy of systems implementing RAG processing.

Conventional approaches, as discussed above, will typically select a fixed number of top-k chunks based on their relevance scores, essentially imposing an arbitrary cut-off. While straightforward to implement, this fails to adapt to the nuances of each query, potentially omitting crucial information if the fixed number is too small or potentially inducing noise or irrelevant chunks if the fixed number is too large. Alternatively, conventional approaches may use a predetermined relevance threshold to filter out chunks, but identifying an optimal relevance threshold is often challenging and context dependent. Further, the inflexible nature of conventional approaches mean that systems may inadvertently retrieve and process an excessive number of chunks, even when a smaller subset would have been sufficient. This often leads to substantial computational costs, which can hinder scalability and practical deployment.

The technical solutions described herein provide functionality for dynamically calculating the number of chunks to be retried in RAG processing by taking into account the specificity of the user query or question (e.g., the is input to the system). This ensures that chunks which are most relevant to the query are retrieved, and helps in reducing noise and adapting to the nuances of each query. Further, the adaptable nature of the technical solutions described herein means that systems will retrieve and process an optimal number of chunks that would be sufficient thus minimizing computational costs, enhancing scalability and facilitating practical deployment.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for retrieval-augmented generation processing using a number of document chunks that are dynamically selected based at least in part on a determined degree of specificity of the search text of a query will now be described in greater detail with reference to FIGS. 11 and 12. Although described in the context of system 100, these platforms may also be used to implement at least portions of other information processing systems in other embodiments.

Figure 11:
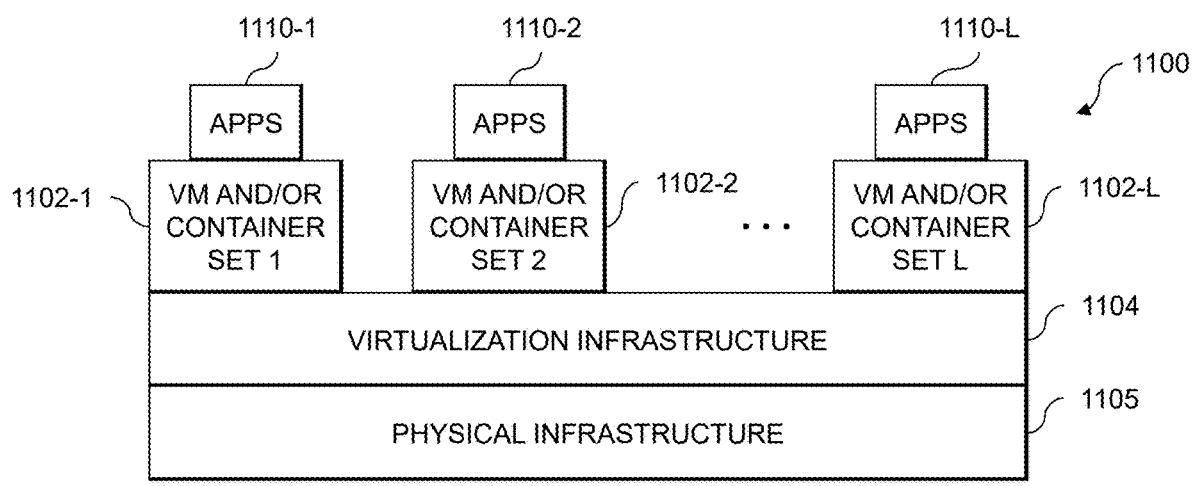
FIGS. 11 and 12 show examples of processing platforms that may be utilized to implement at least a portion of an information processing system in illustrative embodiments.
Figure 12:
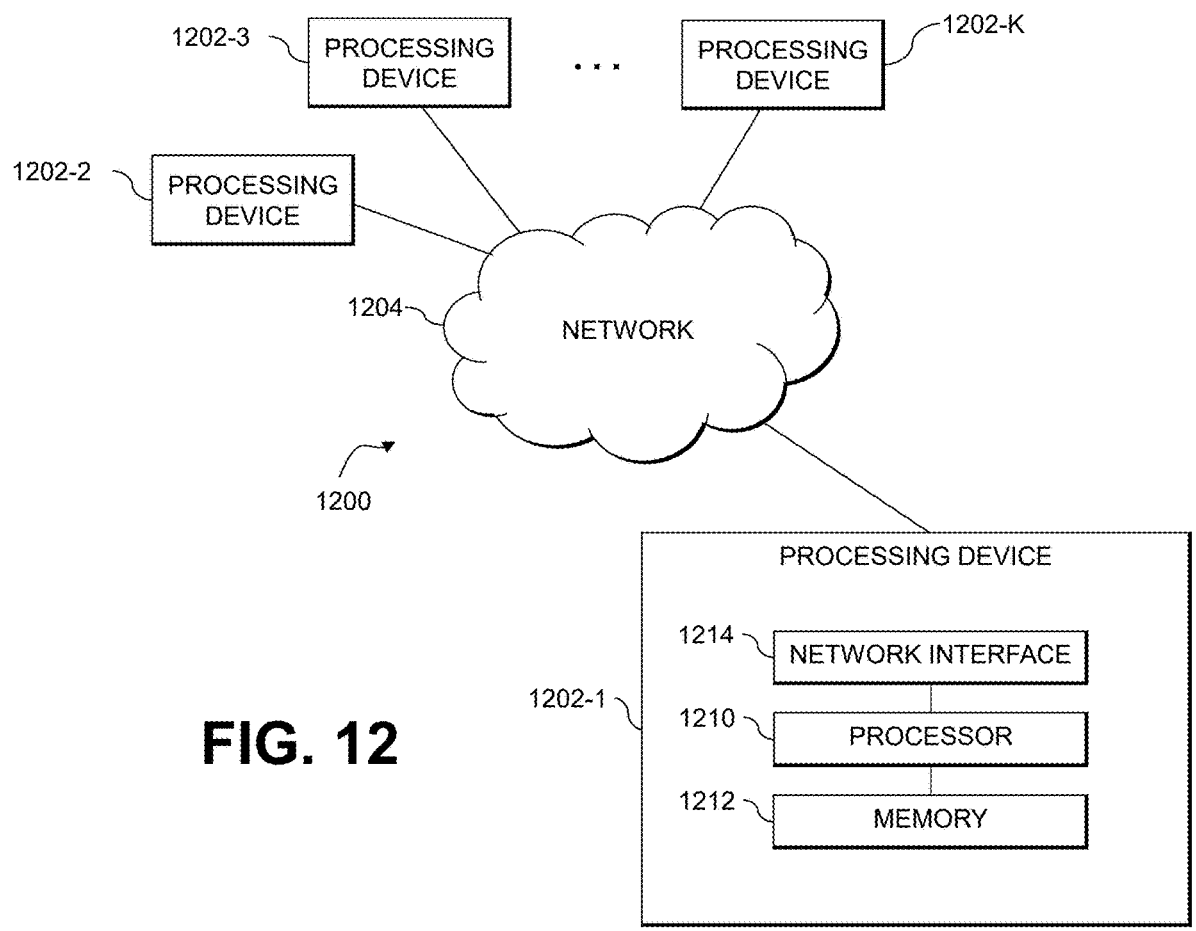

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for retrieval-augmented generation processing using a number of document chunks that are dynamically selected based at least in part on a determined degree of specificity of the search text of a query as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to obtain a query, the query comprising search text and a context, the context identifying one or more documents to be searched using the search text;
to generate a plurality of document chunks by parsing the one or more documents, each of the plurality of document chunks comprising a portion of content of one of the one or more documents;
to determine a degree of specificity of the search text in the query;
to determine, based at least in part on the determined degree of specificity of the search text, a number of the plurality of document chunks to select for retrieval-augmented generation processing;
to select a subset of the plurality of document chunks based at least in part on determining a similarity between content of the plurality of document chunks and the search text, the subset including the determined number of the plurality of document chunks;

to generate, based at least in part on the query, a prompt for input to a machine learning system, the prompt comprising the selected subset of the plurality of document chunks;

to apply the prompt to the machine learning system to generate an output; and to provide an answer to the query based at least in part on the output of the machine learning system.

2. The apparatus of claim 1 wherein determining the degree of specificity of the search text in the query comprises analyzing distribution statistics of semantic similarity scores for a threshold number of the plurality of document chunks most similar to the search text.

3. The apparatus of claim 1 wherein determining the degree of specificity of the search text in the query comprises:

selecting a threshold number of the plurality of document chunks exhibiting a highest semantic similarity to the search text;

calculating semantic similarity scores for the selected threshold number of the plurality of document chunks exhibiting the highest semantic similarity to the search text;

calculating distribution statistics for the calculated semantic similarity scores; and determining the degree of specificity of the search text as a function of the calculated distribution statistics.

4. The apparatus of claim 3 wherein the distribution statistics comprise a mean of the calculated semantic similarity scores, and wherein determining the degree of specificity of the search text as the function of the calculated distribution statistics comprises determining the degree of specificity inversely proportional to the mean of the calculated semantic similarity scores.

5. The apparatus of claim 1 wherein determining the number of the plurality of document chunks to select for retrieval-augmented generation processing of the query comprises utilizing a regression model trained utilizing representative questions generated for the one or more documents, each of the representative questions being associated with a subset of the plurality of document chunks that each of the representative questions is relevant for.

6. The apparatus of claim 5 wherein the at least one processing device is configured to generate the representative questions for the one or more documents by:

generating a plurality of questions from the one or more documents utilizing a large language model; and selecting a subset of the plurality of questions as representative questions.

7. The apparatus of claim 6 wherein generating the plurality of questions from the one or more documents comprises generating, for each of the plurality of document chunks, a set of one or more questions.

8. The apparatus of claim 6 wherein selecting the subset of the plurality of questions as representative questions is based at least in part on clustering the plurality of questions into a set of question clusters, each question cluster including one or more of the plurality of questions exhibiting semantic similarity with one another.

9. The apparatus of claim 1 wherein the at least one processing device is configured to train a regression model utilized for determining the number of the plurality of document chunks to select for retrieval-augmented generation processing of the query, wherein training the regression model comprises:

identifying a characteristic number of relevant document chunks for representative questions generated for the one or more documents, each of the representative questions being associated with a subset of the plurality of document chunks that each of the representative questions is relevant for;

for each of the representative questions:

calculating a semantic similarity score between the representative question and the plurality of document chunks; and determining distribution statistics for the characteristic number of the plurality of document chunks having the highest calculated semantic similarity scores; and training the regression model utilizing a number of the plurality of document chunks that are relevant for each of the representative questions as a target variable and the determined distribution statistics as independent variables.

10. The apparatus of claim 9 wherein the characteristic number comprises a calculated threshold percentile of the number of relevant document chunks for the representative questions.

11. The apparatus of claim 9 wherein the calculated semantic similarity scores comprise cosine similarity values.

12. The apparatus of claim 9 wherein the distribution statistics comprise at least two or mean, median, standard deviation, kurtosis and skewness.

13. The apparatus of claim 9 wherein the regression model comprises a random forest regressor model.

14. The apparatus of claim 1 wherein the machine learning system comprises a large language model utilizing the retrieval-augmented generation processing.

15. A computer program product comprising a non-transitory processor-readable storage medium having stored therein program code of one or more software programs, wherein the program code when executed by at least one processing device causes the at least one processing device:

to obtain a query, the query comprising search text and a context, the context identifying one or more documents to be searched using the search text;

to generate a plurality of document chunks by parsing the one or more documents, each of the plurality of document chunks comprising a portion of content of one of the one or more documents;

to determine a degree of specificity of the search text in the query;

to determine, based at least in part on the determined degree of specificity of the search text, a number of the plurality of document chunks to select for retrieval-augmented generation processing;

to select a subset of the plurality of document chunks based at least in part on determining a similarity between content of the plurality of document chunks and the search text, the subset including the determined number of the plurality of document chunks;

to generate, based at least in part on the query, a prompt for input to a machine learning system, the prompt comprising the selected subset of the plurality of document chunks;

to apply the prompt to the machine learning system to generate an output; and to provide an answer to the query based at least in part on the output of the machine learning system.

16. The computer program product of claim 15 wherein determining the degree of specificity of the search text in the query comprises analyzing distribution statistics of semantic similarity scores for a threshold number of the plurality of document chunks most similar to the search text.

17. The computer program product of claim 15 wherein determining the number of the plurality of document chunks to select for retrieval-augmented generation processing of the query comprises utilizing a regression model trained utilizing representative questions generated for the one or more documents, each of the representative questions being associated with a subset of the plurality of document chunks that each of the representative questions is relevant for.

18. A method comprising:
  obtaining a query, the query comprising search text and a context, the context identifying one or more documents to be searched using the search text;
  generating a plurality of document chunks by parsing the one or more documents, each of the plurality of document chunks comprising a portion of content of one of the one or more documents;
  determining a degree of specificity of the search text in the query;
  determining, based at least in part on the determined degree of specificity of the search text, a number of the plurality of document chunks to select for retrieval-augmented generation processing;
  selecting a subset of the plurality of document chunks based at least in part on determining a similarity between content of the plurality of document chunks and the search text, the subset including the determined number of the plurality of document chunks;
  generating, based at least in part on the query, a prompt for input to a machine learning system, the prompt comprising the selected subset of the plurality of document chunks;
  applying the prompt to the machine learning system to generate an output; and
  providing an answer to the query based at least in part on the output of the machine learning system;
  wherein the method is performed by at least one processing device comprising a processor coupled to a memory.

19. The method of claim 18 wherein determining the degree of specificity of the search text in the query comprises analyzing distribution statistics of semantic similarity scores for a threshold number of the plurality of document chunks most similar to the search text.

20. The method of claim 18 wherein determining the number of the plurality of document chunks to select for retrieval-augmented generation processing of the query comprises utilizing a regression model trained utilizing representative questions generated for the one or more documents, each of the representative questions being associated with a subset of the plurality of document chunks that each of the representative questions is relevant for.

* * * * *